US008953604B2

United States Patent
Wijnands et al.

(10) Patent No.: US 8,953,604 B2
(45) Date of Patent: Feb. 10, 2015

(54) ROOT NODE REDUNDANCY FOR MULTIPOINT-TO-MULTIPOINT TRANSPORT TREES

(75) Inventors: Ijsbrand Wijnands, Leuven (BE); Arjen Boers, Sitges (ES); Alton Lo, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 721 days.

(21) Appl. No.: 12/944,901

(22) Filed: Nov. 12, 2010

(65) Prior Publication Data

US 2011/0058567 A1 Mar. 10, 2011

Related U.S. Application Data

(63) Continuation of application No. 11/346,411, filed on Feb. 2, 2006, now Pat. No. 7,835,378.

(51) Int. Cl.
| | |
|---|---|
| *H04L 12/753* | (2013.01) |
| *H04L 12/18* | (2006.01) |
| *H04L 12/751* | (2013.01) |
| *H04L 12/761* | (2013.01) |
| *H04L 12/703* | (2013.01) |
| *H04L 12/801* | (2013.01) |
| *H04L 12/803* | (2013.01) |

(52) U.S. Cl.
CPC ............... *H04L 12/18* (2013.01); *H04L 45/02* (2013.01); *H04L 45/16* (2013.01); *H04L 45/28* (2013.01); *H04L 45/48* (2013.01); *H04L 47/10* (2013.01); *H04L 47/125* (2013.01)
USPC .......................................... 370/392; 370/401

(58) Field of Classification Search
None
See application file for complete search history.

(56) References Cited

U.S. PATENT DOCUMENTS

| | | | |
|---|---|---|---|
| 5,473,599 A | 12/1995 | Li et al. | 370/219 |
| 5,831,975 A | 11/1998 | Chen et al. | 370/256 |
| 6,463,062 B1 | 10/2002 | Buyukkoc et al. | 370/395.1 |
| 6,662,308 B1 | 12/2003 | Baroni et al. | 714/4 |
| 6,671,819 B1 | 12/2003 | Passman et al. | 714/4 |
| 6,798,739 B1 * | 9/2004 | Lee | 370/216 |
| 6,996,108 B1 | 2/2006 | Budhraja | 370/395.41 |
| 7,117,273 B1 | 10/2006 | O'Toole et al. | 709/252 |

(Continued)

OTHER PUBLICATIONS

N. Bhaskar et al., Internet Engineering Task Force, "Bootstrap Router (BSR) Mechanism for PIM," Internet Engineering Task Force, Oct. 23, 2005, © The Internet Society (2005), pp. 1-40.

(Continued)

*Primary Examiner* — Duc Duong
(74) *Attorney, Agent, or Firm* — Campbell Stephenson LLP

(57) ABSTRACT

A mechanism is provided to configure a plurality of transport trees in a transport network, each of which correspond to a native tree (e.g., a bidirectional multicast tree). In embodiments of the present invention, each of the plurality of transport trees has a unique root node so that in the event of a failure of any root node, the transport trees with surviving root nodes can be used to transport traffic from the native tree. The present invention provides for each transport network edge router being independently responsible for selection of a transport tree that the edge router will use to transmit a datastream, while also being capable of receiving packets from any transport tree. Through the use of such configured transport trees along with independent selection of a transport tree, the present invention provides a reduction in the disruption of datastream transmission due to a root node failure.

19 Claims, 11 Drawing Sheets

(56) References Cited

U.S. PATENT DOCUMENTS

| | | | |
|---|---|---|---|
| 7,139,928 B1 | 11/2006 | Bhattacharya et al. | 714/4 |
| 7,519,056 B2 | 4/2009 | Ishwar et al. | 370/389 |
| 7,545,735 B1 | 6/2009 | Shabtay et al. | 370/217 |
| 2002/0186652 A1* | 12/2002 | Popovich | 370/218 |
| 2003/0021223 A1 | 1/2003 | Kashyap | 370/217 |
| 2003/0091049 A1 | 5/2003 | Abe et al. | 370/392 |
| 2003/0161338 A1 | 8/2003 | Ng et al. | 370/437 |
| 2004/0006640 A1 | 1/2004 | Inderieden et al. | 709/242 |
| 2004/0017816 A1 | 1/2004 | Ishwar et al. | 370/395.53 |
| 2004/0264462 A1* | 12/2004 | Bardalai et al. | 370/390 |
| 2005/0074003 A1 | 4/2005 | Ball et al. | 370/389 |
| 2005/0086469 A1* | 4/2005 | Dunagan et al. | 713/163 |
| 2005/0243825 A1 | 11/2005 | Bitar et al. | 370/390 |
| 2005/0249229 A1 | 11/2005 | Wilkie et al. | 370/422 |
| 2006/0056384 A1 | 3/2006 | Ishii et al. | 370/351 |
| 2006/0092940 A1 | 5/2006 | Ansari et al. | 370/392 |
| 2006/0126496 A1 | 6/2006 | Filsfils et al. | 370/216 |
| 2006/0164975 A1 | 7/2006 | Filsfils et al. | 370/225 |
| 2006/0193332 A1 | 8/2006 | Qian et al. | 370/397 |
| 2006/0215577 A1 | 9/2006 | Guichard et al. | 370/254 |
| 2006/0280131 A1 | 12/2006 | Rahman et al. | 370/256 |
| 2007/0019646 A1* | 1/2007 | Bryant et al. | 370/390 |
| 2007/0104194 A1* | 5/2007 | Wijnands et al. | 370/390 |
| 2007/0127473 A1* | 6/2007 | Kessler et al. | 370/390 |
| 2007/0177527 A1 | 8/2007 | Bragg et al. | 370/256 |
| 2009/0274153 A1* | 11/2009 | Kuo et al. | 370/392 |
| 2010/0195650 A1* | 8/2010 | Stewart | 370/390 |

OTHER PUBLICATIONS

D. Estrin et al., Network Working Group, RFC: 2362, "Protocol Independent Multicast-Sparse Mode (PIM-SM): Protocol Specification," Jun. 1998, pp. 1-66.

Cisco Systems, "Integrating the Cisco Gigabit Ethernet Switch Module (CGESM) for HP BladeSystem p-Class into the Cisco Data Center Network Architecture," Rev 3, Mar. 15, 2005 pp. 1-21.

Callon et al., "A Framework for Multi protocol Label Switching," Nov. 21, 1997, pp. 1-64.

* cited by examiner

ROOT NODE REDUNDANCY FOR MULTIPOINT-TO-MULTIPOINT TRANSPORT TREES

CROSS REFERENCE TO RELATED APPLICATIONS

This application is a continuation of U.S. application Ser. No. 11/346,411, entitled "Root Node Redundancy for Multipoint-to-Multipoint Transport Trees," filed Feb. 2, 2006, now U.S. Pat. No. 7,835,378 and naming Ijsbrand Wijnands, Arjen Boers and Alton Lo as inventors, and is hereby incorporated by reference herein, in its entirety and for all purposes.

FIELD OF THE INVENTION

This invention relates to the field of information networks, and more particularly relates to providing root node redundancy for multipoint-to-multipoint transport network transport trees, thus permitting make-before-break failure protection for root nodes and root node load balancing.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase.

As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's transport network to provide connectivity between the disparate geographic sites of the business' network elements. In order for the business' network to seamlessly function through the transport network, the transport network must be able to provide a medium for transmission of all the business' various types of datastreams, including multicast transmission.

Multicast routing protocols enable multicast datastream transmission (i.e., one-to-many connections and many-to-many connections) by replicating a multicast data packet close to the destinations of that packet, thereby obviating the need for multiple unicast connections for the same purpose; thus, saving network bandwidth and improving throughput. Upon receiving a multicast packet, a network node (e.g., a router) can examine a multicast group destination address (GDA) of the packet and determine whether downstream subscribers to the multicast packet (i.e., members of the multicast group) are connected to the network node (either directly or indirectly). The network node can then replicate the multicast packet as needed and transmit the replicated packets to any connected subscribers.

FIG. 1A is a simplified block diagram of a network transporting a multicast transmission. Network router elements 110, 120, 130 and 140 are coupled through network links 150, 160, and 170. Network router element 110 is also coupled to network elements 111 and 112; network router element 120 is coupled to network element 121; network router element 130 is coupled to network elements 131 and 132; and, network router element 140 is coupled to network element 141. Such coupling between the network router elements and the network elements can be direct or indirect (e.g., via a L2 network device or another network router element).

For the purposes of this illustration, network element 111 is a multicast source transmitting a datastream to a multicast group that includes network elements 112, 121, 131, 132 and 141. A multicast datastream, having a group destination address to which the above network elements have subscribed as receiver members, is transmitted from network element 111 to network router element 110 (illustrated by the arrow from 111 to 110). Network router element 110 determines where to forward packets in the multicast datastream by referring to an internal address table that identifies each port of network router element 110 that is coupled, directly or indirectly, to a subscribing member of the multicast group. Network router element 110 then replicates packets of the multicast datastream and then transmits the packets from the identified ports to network element 112, network router element 120 and network router element 130.

Network router elements 120 and 130 can inform network router element 110 that they are coupled to a subscribing member of a multicast datastream using, for example, a protocol independent multicast (PIM) message. Using PIM, network router elements 120 and 130 can send messages indicating that they need to join (a "JOIN" message) or be excluded from (a "PRUNE" message) receiving packets directed to a particular multicast group or being transmitted by a particular source. Similarly, a network element can inform a first-hop network router element that the network element wishes to be a subscriber to a multicast group by sending a membership report request through a software protocol such as internet group management protocol (IGMP). When a network element wishes to subscribe to a multicast transmission, an IGMP membership request frame can be transmitted by the network element. An IGMP-enabled network router element (or a L2 network device) can have "snooping" software executing to read such a frame and build a corresponding entry in a multicast group address table.

Upon receipt by network router elements 120 and 130, packets from the multicast datastream will be replicated as needed by those network router elements to provide the multicast datastream to network elements coupled to those network router elements (e.g., network elements 131 and 132 or network router element 140). In this manner, a multicast datastream from network element 111 can be transmitted through a network to multiple receiving network elements. The path of such a transmission can be thought of as a tree, wherein network element 111 is the root of the tree and network elements 121, 131, 132, and 141 can be thought of as the tips of branches.

FIG. 1B is a simplified block diagram of a network in which multiple sources are transmitting to a multicast group. As in FIG. 1A, network element 111 is a source for a multicast datastream directed to a multicast group including network elements 112, 121, 131, 132, and 141. That multicast datastream is illustrated by path 180 (a solid line). Network element 132 is also transmitting a multicast datastream to the multicast group, and that datastream is illustrated by path 190 (a dashed line). In a multiple source multicast group, any subscriber network element can be a source. In order to provide this two-way routing of multicast data packets, a bi-directional version of protocol independent multicast (PIM bidir) is used to configure the network router elements in the multicast tree. In bi-directional multicast, datastream packets are routed only along the shared bi-directional tree, which is rooted at a rendezvous point for the multicast group, rather than at a particular datastream source. Logically, a rendezvous point is an address (e.g., a network router element) that is "upstream" from all other network elements. Passing all bi-directional multicast traffic through a rendezvous point establishes a loop-free tree topology having the rendezvous point as a root. In FIG. 1B, the rendezvous point is illustrated as network router element 110.

FIGS. 1A and 1B illustrate transmission of multicast datastreams in a network in which the network router elements 110, 120, 130 and 140 are directly coupled with one another. But, as stated above, as a business and its network grow, a business' network elements can become geographically diverse and therefore the path over which the datastream must flow can include an intervening third-party provider transport network.

FIG. 2 is a simplified block diagram illustrating a network configuration in which geographically diverse subnets of a business' network are coupled through a transport network 200. The business' network includes network router elements 210, 220, 230, and 240, wherein network router element 210 is coupled to network elements 211 and 212, network router element 220 is coupled to network element 221, network router element 230 is coupled to network elements 231 and 232, and network router element 240 is coupled to network element 241. In order to connect to the transport network, a network router element on the edge of the business' network (a customer edge router) is coupled to a network router element on the edge of the transport network (a provider edge router (PE)). In FIG. 2, customer edge router elements 250 (1)-(3) are coupled to PEs 260(1)-(3), respectively. Network router element 240 is coupled to PE 260(4) (that is, network router element 240 is configured as a customer edge router). It should be noted that the terms "provider edge router" and "customer edge router" are used to distinguish between an edge router that is a member of a transport network (a provider edge router) and an edge router that is a member of a network external to the transport network (a customer edge router). Such terms are not meant to limit the discussion or the invention presented herein to networks of a third-party provider and customers of the provider.

The customer edge router and the provider edge router functionality can be provided by a single router. Further, a network router element such as 240 can also serve as an edge router. The provider edge routers provide access to the transport network which can contain data transmission lines, network router elements, and OSI Level 2 network devices to aid in the transmission of data packets from one provider edge router to another provider edge router. The transport network illustrated in FIG. 2 contains, as an example, network router elements 270(1)-(5) and 270(r), which are coupled in a manner to permit transmission of packets through the transport network. Such network router elements internal to a transport network are called "core router elements" or "core routers." A transport network is not limited to such a configuration, and can include any number of network router elements, transmission lines, and other L2 and L3 network devices.

In order to facilitate transmission of data packets through a transport network, the transport network can utilize different protocols from those used in coupled customer networks. Such transport network protocols can permit faster or more efficient data transmission and routing through the network. Any needed translation between customer and transport network protocols can be performed by the edge routers.

FIG. 3 is a simplified block diagram illustrating another representation of a transport network 300. It should be understood that the term "transport network" corresponds to any network of coupled network router elements including edge network router elements ("edge routers") and core network router elements ("core routers") as those terms are understood in the art. FIG. 3 illustrates a set of transport network edge routers 320(1)-(4). These edge routers are connected by a network including core routers 310(1)-(6) and 315(1)-(2). Using transport network protocols, such as MPLS or tunneling protocols, a datastream can be transmitted from an edge router to any other edge router via a subset of the core routers in the transport network. A datastream can also be transmitted from an edge router to a plurality of other edge routers via a configured point-to-multipoint path through the core of the transport network; such a configured path is called a transport tree. A transport tree can also be configured to transport datastreams from a plurality of transmitting edge routers to a plurality of other edge routers via a multipoint-to-multipoint configured path through the core of the transport network; such a transport tree can be specifically called a multipoint-to-multipoint transport tree.

FIG. 4A is a simplified block diagram illustrating relevant components of a multipoint-to-multipoint transport tree configured in transport network 300 of FIG. 3. A multicast datastream source S1 is coupled, directly or indirectly, to edge router 320(1), which is configured as an ingress router to the transport network for a datastream originating with source S1. Edge routers 320(2)-(4) are egress routers for the datastream from source S1 to exit the transport network en route to subscribers for the multicast datastream. Datastream packets from source S1 flow through network core routers along the path illustrated by solid arrows through transport network 300. Similarly, a multicast datastream source S2 is coupled to edge router 320(4), which serves as an ingress router to the transport network for a datastream from source S2. Edge routers 320(1)-320(3) are egress routers for the datastream from source S2 to exit the transport network en route to subscribers for the multicast datastream. Datastream packets from source S2 can flow through transport network 300 core routers along a path illustrated by the dashed arrows. Transport network core routers 310(1)-(6) and 315(1) can transmit and replicate packets from the two datastreams, as necessary.

In a multipoint-to-multipoint transport tree, datastreams must be able to flow "downstream" from a source to a group of receivers and also "upstream" from each receiver acting as a source to each other receiver of the group. Similar to bi-directional multicast trees, in order to permit loop-free, upstream data flow, a root node is established within the transport network. Each transport network router will be configured to find a path to the root node. When a multipoint-to-multipoint transport tree is configured, the root node is selected for that transport tree. Typically, a root node is chosen to be convenient and well-connected to all edge routers that may become members of the transport tree. Edge routers can be informed of the identity of a root node associated with a transport tree when that transport tree is constructed. Static configuration of the edge routers can be used to inform the edge routers of the identity of a root node associated with a transport tree.

In FIG. 4A, core router 315(1) is the root node of the illustrated multipoint-to-multipoint transport tree. From the perspective of each edge router not coupled to a multicast datastream source and each intermediate core router, the root node is always considered to be in the upstream direction. Thus, datastream packets transmitted on the multipoint-to-multipoint transport tree will first be directed to the root node and from there will be directed toward member edge routers via the core routers.

The root node in a multipoint-to-multipoint transport tree serves a role as a hub of datastream transport through the transport tree. In the event of failure of a root node, datastream transport on the associated transport tree will also fail. In a typical transport network, recovery from failure of a transport tree root node requires constructing a new transport tree with an associated new root node.

FIG. 4B is a simplified block diagram illustrating a second multipoint-to-multipoint transport tree configured in transport network 300 to transport the multicast datastreams from sources S1 and S2. It is noted that datastream packets from S1 and S2 have the same multicast group destination address. Rather than routing the datastreams through failed core router 315(1) (which served as the root node for the transport tree illustrated in FIG. 4A), the second transport tree has a selected root node at core router 315(2). Building such a second transport tree re-establishes multipoint-to-multipoint communications, but communications are disrupted during the time to build the second transport tree. The length of time to create the new transport tree can be affected by activities such as detection of the failure of root node 315(1), coordinating the building activities of the various edge network router elements, and reestablishing a link between the native transport trees of sources S1 and S2 (e.g., multicast transport trees).

A mechanism is therefore desired to decrease or eliminate the amount of time of disruption in communications due to the failure of a root node.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention, in one embodiment, provides a mechanism to configure a plurality of transport trees in a transport network, each of which correspond to a native tree (e.g., a bidirectional multicast tree). In embodiments of the present invention, each of the plurality of multipoint-to-multipoint transport trees has a unique root node so that in the event of a failure of any root node, the transport trees with surviving root nodes can be used to transport traffic from the native tree. The present invention can further provide that each transport network edge router is independently responsible for selection of a transport tree that the edge router will use to transmit a datastream, while also being capable of receiving packets from any transport tree. Through the use of such configured transport trees along with independent selection of a transport tree, the present invention reduces the length of disruption time in datastream transmission due to a root node failure. Aspects of the present invention can further provide a capacity for root node load balancing by permitting data transmission over any of the configured transport trees on a source-by-source (or edge router-by-edge router) basis.

Figure 3:
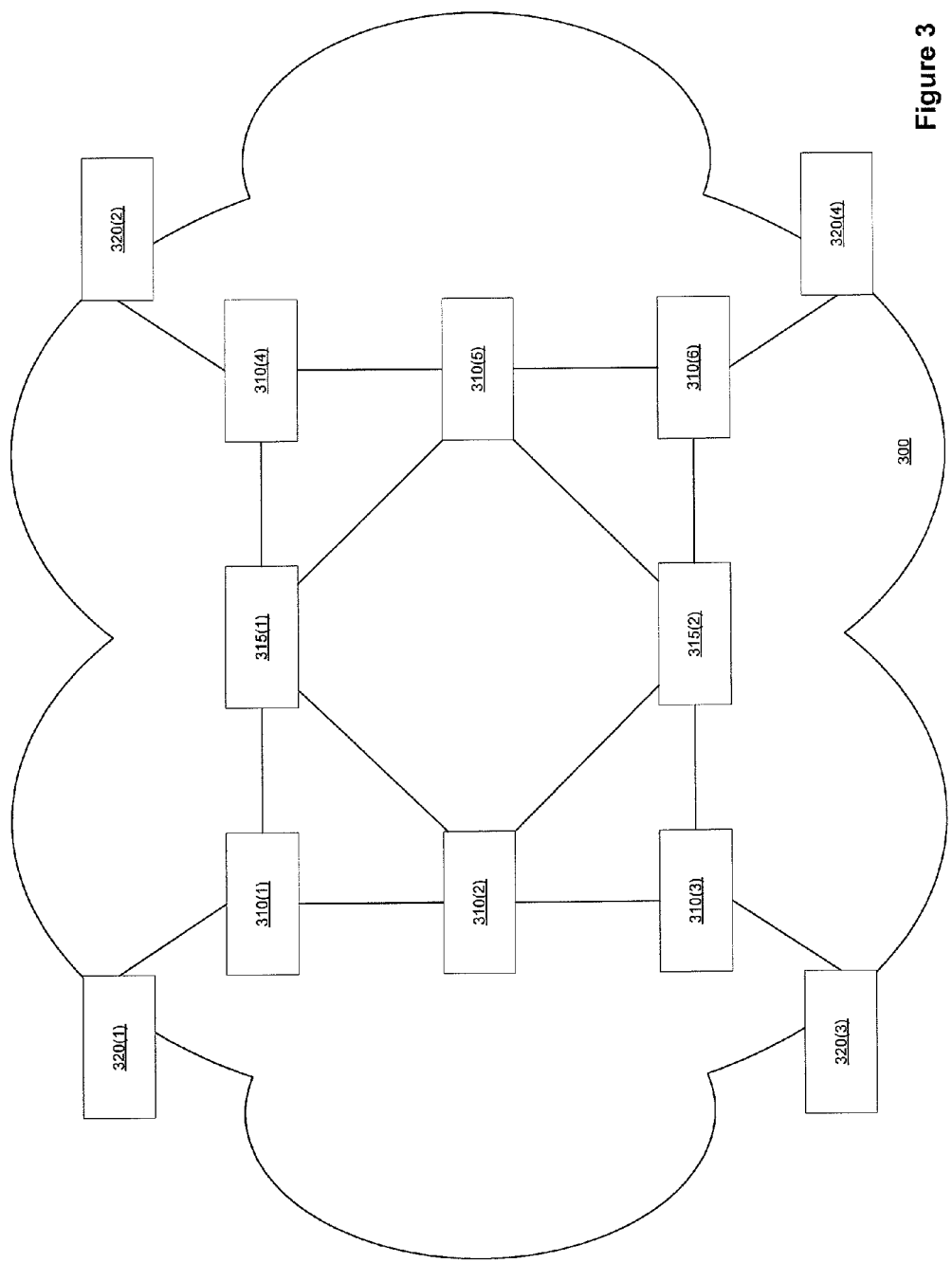
FIG. 3 is a simplified block diagram illustrating an alternate representation of a transport network.
Figure 4A:
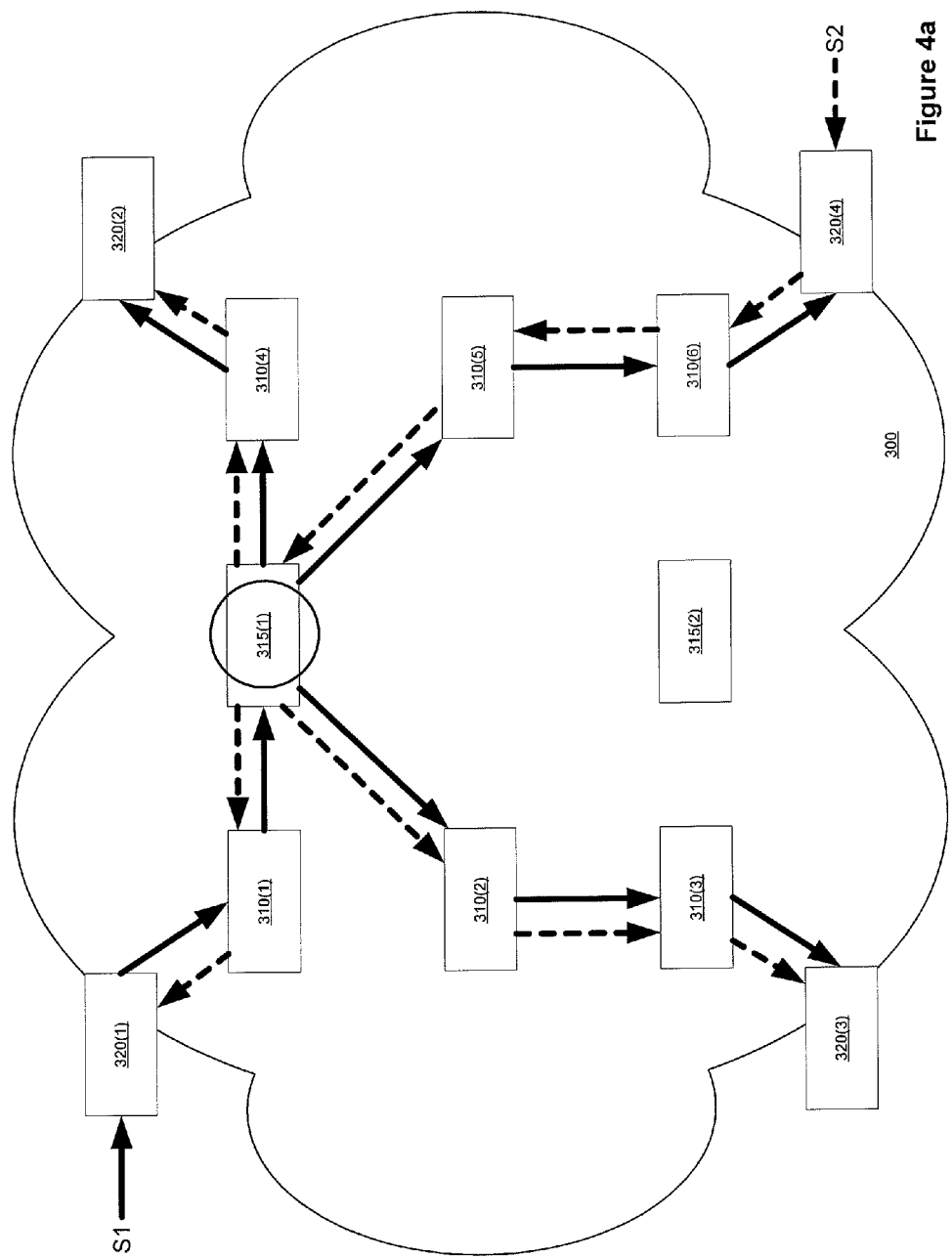
FIG. 4A is a simplified block diagram illustrating a first multipoint-to-multipoint transport tree configured in the transport network of FIG. 3 to transport multicast datastreams.
Figure 4B:
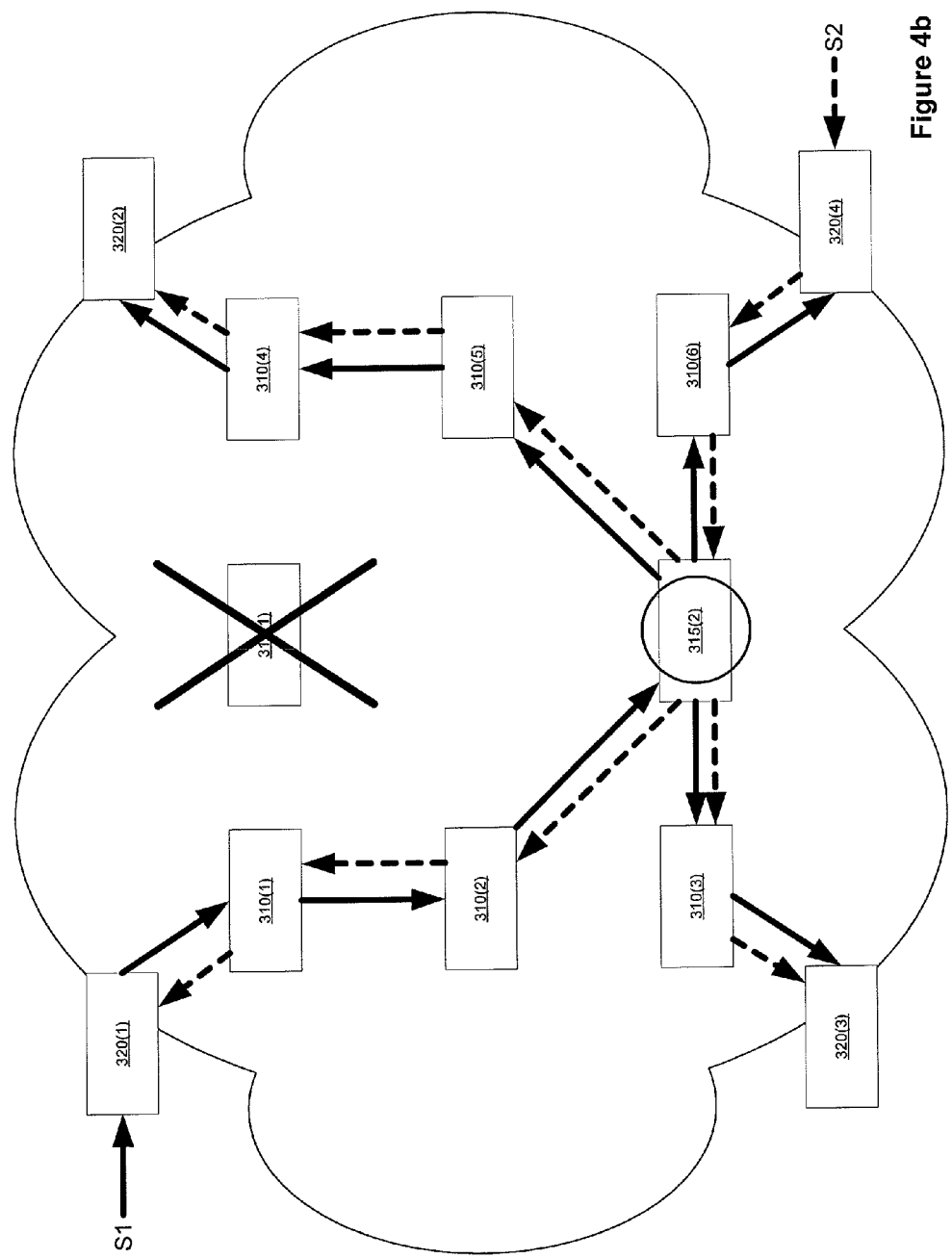
FIG. 4B is a simplified block diagram illustrating a second multipoint-to-multipoint transport tree configured in transport network of FIG. 3 to transport multicast datastreams upon failure of the first multipoint-to-multipoint transport tree.

Embodiments of the present invention operate in transport networks such as the transport network illustrated in FIG. 3 (e.g., an MPLS network or a network utilizing a tunneling protocol). Transport networks employing the present invention are assumed to include a transport tree construction protocol that allows for dynamically building new transport trees or modifying egress router element fan-out of an existing tree. Such a protocol can be egress initiated, wherein egress router elements perform tree maintenance in a distributed fashion by joining and leaving the tree. Such a construction protocol will typically include a mechanism to notify the edge router elements when an action on the transport tree is successfully executed and the tree is ready to deliver traffic to its new set of egress router elements.

Upon receipt of a request to join a multicast group, an edge router can determine whether that edge router is already a member of a transport tree transporting the datastream transmissions directed to the requested multicast group. If the edge router is not a member of such a transport tree, then a multipoint-to-multipoint transport tree or a branch thereof can be built. One example of a multipoint-to-multipoint transport tree building process useable in conjunction with embodiments of the present invention is disclosed in pending U.S. application Ser. No. 11/204,837, entitled "Building Multipoint-to-Multipoint Label Switch Paths," filed on Aug. 16, 2005 by I. Wijnands and A. Boers, which is incorporated herein by reference. Other methods of building multipoint-to-multipoint transport trees (or tunnels) that permit selection of a root node for such a transport tree are also compatible with embodiments of the present invention.

Rather than building one multipoint-to-multipoint transport tree having a single root node in the transport network, the present invention constructs a plurality of multipoint-to-multipoint transport trees, each having a unique root node. The present invention maps each transport tree that is constructed to the same native tree (e.g., a bi-directional multicast tree). As each transport tree is instructed, a root node can be configured that is conveniently and well-connected to all the member edge routers.

The present invention provides that each of the plurality of transport trees has a unique transport tree identifier. A transport tree identifier can be formed that is dependent upon the root node identifier (e.g., an IP address of the root node) for the associated transport tree. One example of forming a transport tree identifier that contains information such as root node identifier and information related to an associated native tree can be found in co-pending U.S. patent application Ser. No. 11/267,674, entitled "In-Band Multicast Signaling Using LDP," filed on Nov. 4, 2005 by Wijnands, et al., which is incorporated by reference. This incorporated patent application provides for the generation of a transport tree identifier that includes both a root identifier and an opaque field within the transport tree identifier. The opaque field value, which is not interpreted by core routers in a transport network, can include information identifying the native transport tree, while the non-opaque portion of the transport identifier can include an identifier of the root node of the transport tree. Using such a mechanism for generating transport tree identifiers, multiple transport trees can be built that are associated with the same native tree. The plurality of transport trees can be constructed sequentially or concurrently, depending upon the needs of the application. If the transport trees are built sequentially, transmission of datastreams through the transport network can begin upon the completion of construction of the first transport tree. Once the desired plurality of transport trees have been configured, transmission through the transport network along those trees can be performed as configured within the particular application.

Root Node Failover

Figure 5A:
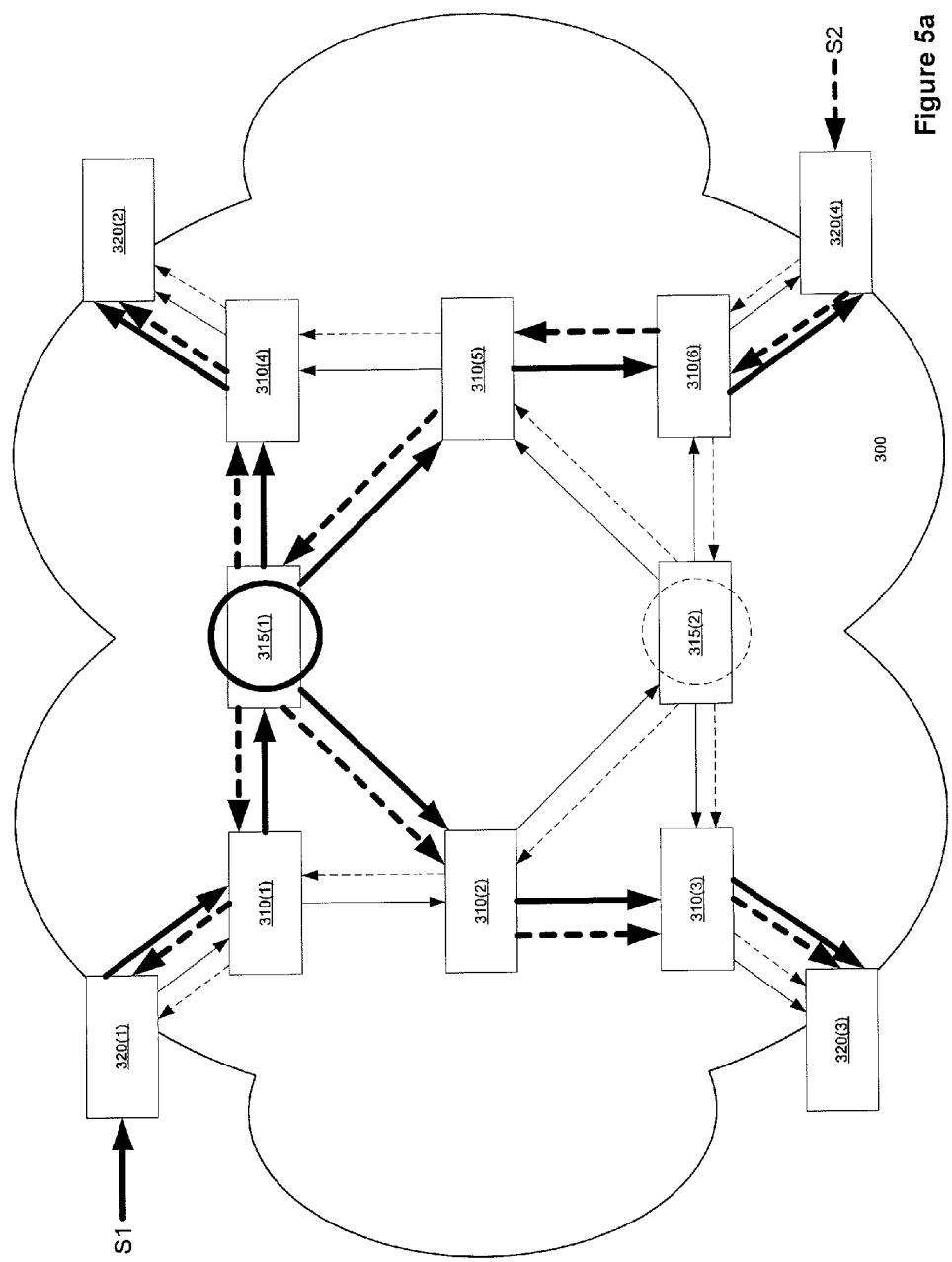
FIG. 5A is a simplified block diagram of the transport network of FIG. 3 wherein two multipoint-to-multipoint transport trees are configured to allow for continuation of datastream transmission in the event of root node failure in one of the transport trees, in accord with embodiments of the present invention.

FIG. 5A is a simplified block diagram of transport network 300 (as illustrated in FIG. 3) wherein two multipoint-to-multipoint transport trees are configured to allow for continuation of datastream transmission in the event of root node failure in one of the transport trees. A first transport tree is configured in transport network 300 with core router 315(1) as a root node. A second transport tree is configured with core router element 315(2) as a root node. Both transport trees are configured to transport bi-directional multicast datastreams originating from sources S1 (illustrated by solid arrowed lines) and S2 (illustrated by dashed arrowed lines). Edge routers 320(1)-(4) are configured to select the first transport tree (rooted at core router 315(1)) to transmit the multicast datastreams. The first transport tree is illustrated by the heavy arrow lines while the second transport tree is illustrated by the thin arrowed lines. In this initial configuration, all multicast datastream traffic associated with the native tree is transmitted along the first transport tree and no traffic is transmitted along the second transport tree.

Figure 5B:
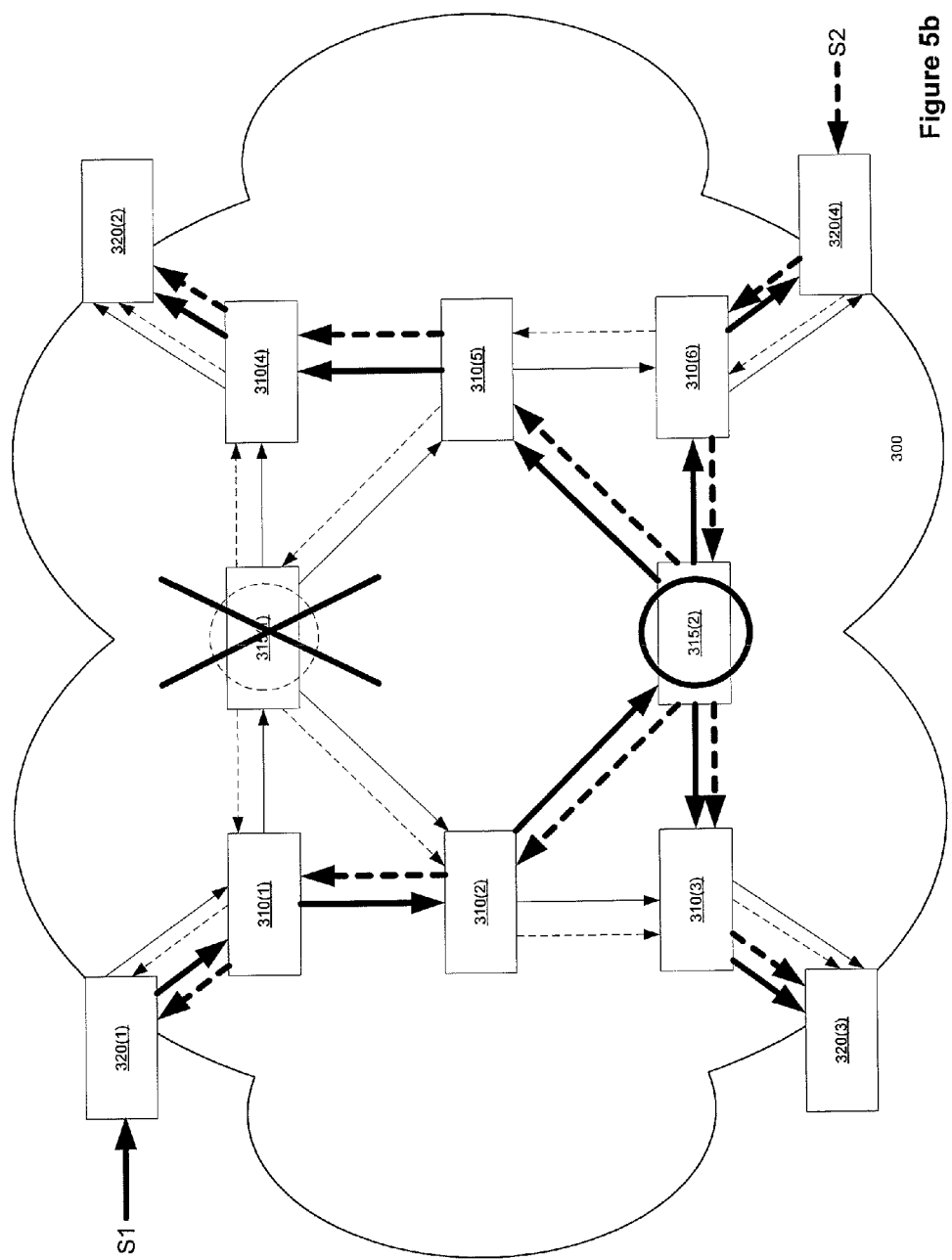
FIG. 5B is a simplified block diagram illustrating the state of the transport trees of FIG. 5A in the event of a failure of a root node, in accord with embodiments of the present invention.

FIG. 5B is a simplified block diagram illustrating the state of the transport trees in the event of a failure of root node 315(1). Upon detection of a failure of root node 315(1), edge routers 320(1) and 320(4) coupled to sources S1 and S2, respectively, select the second transport tree rooted at core router 315(2) for transmission of the multicast datastreams. Again, the selected transport tree is shown using heavy arrowed lines while the unselected transport tree (the first transport tree) is shown in thin arrowed lines. The decision to switch from the first transport tree to the second transport tree is a local policy at the edge routers. Since the second transport tree (the backup tree) was already constructed, all member edge routers are already connected to the second transport tree. Therefore, as soon as an edge router switches to the second transport tree, datastream packets the edge router transmits along that transport tree will be received by all member edge routers. The receiving edge routers are indifferent as to the transport tree on which the datastream arrives since the transport trees are preconfigured to be associated with the native tree.

Transmitting edge routers can be configured to perform a failover switch from a first to a second transport tree as soon as they receive notice of the failure of the root node of the first transport tree. In one embodiment of the present invention, when a root node is defined for a transport tree, the address for that root node can be included in router unicast routing tables as a single host route (e.g., identified by a /32 or a 255.255.255.255 network mask). In the event that the root node fails or becomes inaccessible, so then does the single host route to that root node. Unicast routing monitoring (e.g., IGP) detects that the single host route network has become unavailable and updates the unicast routing tables. At that time, an edge router can then perform tasks associated with failover selection to a transport tree that does not incorporate the failed root node. As stated above, because the second transport tree is preconfigured, transmitting edge routers can switch over to the second transport tree immediately upon detection of a root node failure.

Load Balancing

Embodiments of the present invention permit transport network edge routers to select from any of the plurality of configured transport trees for transmission of datastreams. As discussed above, one such selection criteria can be based upon failure of a root node of a previously selected transport tree. Other criteria can be used by the edge routers to perform transport tree selection. In one embodiment of the present invention, load balancing between root nodes can be the basis for transport tree selection.

Figure 5C:
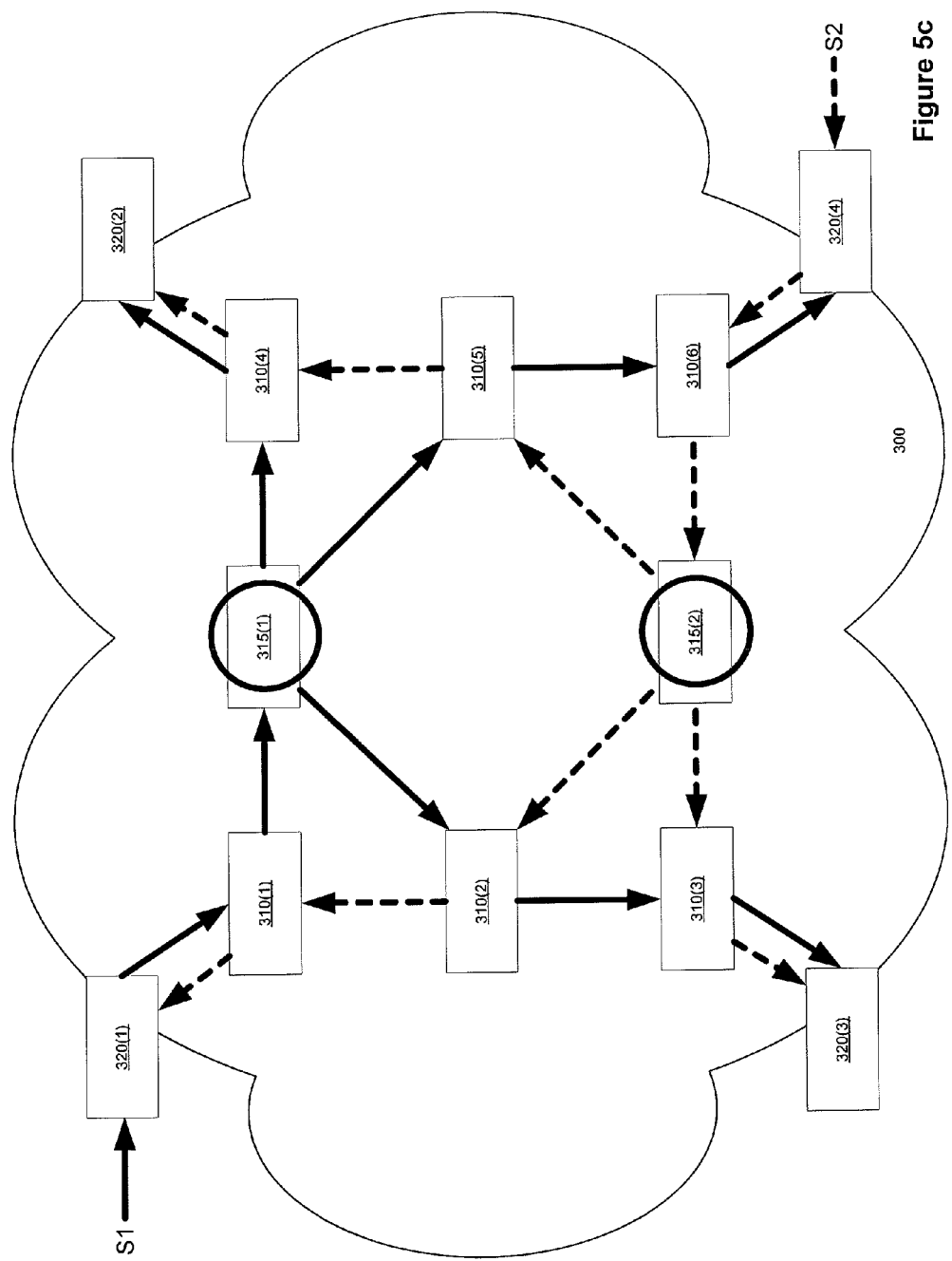
FIG. 5C is a simplified block diagram illustrating the transport network of FIG. 3 wherein two transport trees with unique root nodes are both used to transmit multipoint-to-multipoint datastreams, in accord with embodiments of the present invention.

FIG. 5C is a simplified block diagram illustrating transport network 300 wherein two transport trees with unique root nodes are used to transmit multipoint-to-multipoint datastreams. As with FIGS. 5A and 5B, two transport trees are configured: a first transport tree with a first root node 315(1), and a second transport tree with a second root node 315(2). In the scenario illustrated in FIG. 5C, datastreams originating at source S1 are transmitted through the transport network using the first transport tree rooted at 315(1), while datastreams originating at source S2 are transmitted through the transport network via the second transport tree rooted at 315(2).

As discussed above, since both transport trees include all of the member edge routers and are both associated with the native tree (e.g., a bi-directional multicast tree for (*,G), where "G" is the address of the multicast group or GDA), edge routers 320(1) and 320(4) associated with sources S1 and S2, respectively, can independently select a transport tree on which to transmit datastreams from S1 and S2, respectively, associated with the multicast group. An edge router can determine whether a root node is handling more than a certain threshold of data transmission. If the transmission threshold is exceeded, then an edge router can select a transport tree with a different root node on which to send a datastream through the transport network. In this manner, a load balancing can be achieved between root nodes on available transport trees. In one embodiment of the present invention, an edge router in an MPLS transport network can determine root node load, in part, by examining labels of incoming datastream packets in order to determine the transport tree on which the packet was transported on transport network 300. By tracking the number of packets arriving over a period of time from a transport tree, an edge router can select a transport tree on which to transmit a datastream passing through that edge router.

Example Configuration and Selection of Transport Trees

Figure 1A:
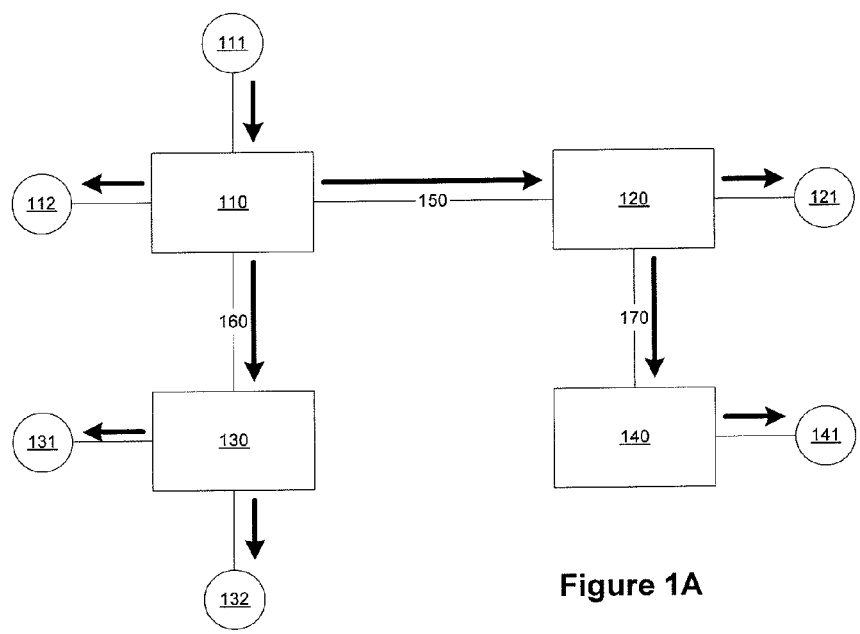
FIG. 1A is a simplified block diagram of a network transporting a multicast transmission.
Figure 1B:
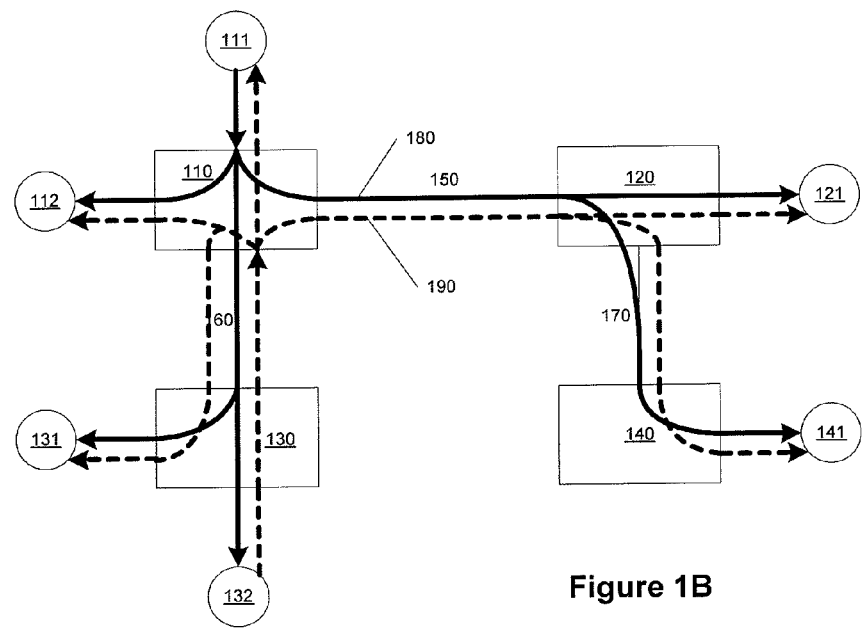
FIG. 1B is a simplified block diagram of a network in which multiple sources are transmitting to a multicast group.
Figure 2:
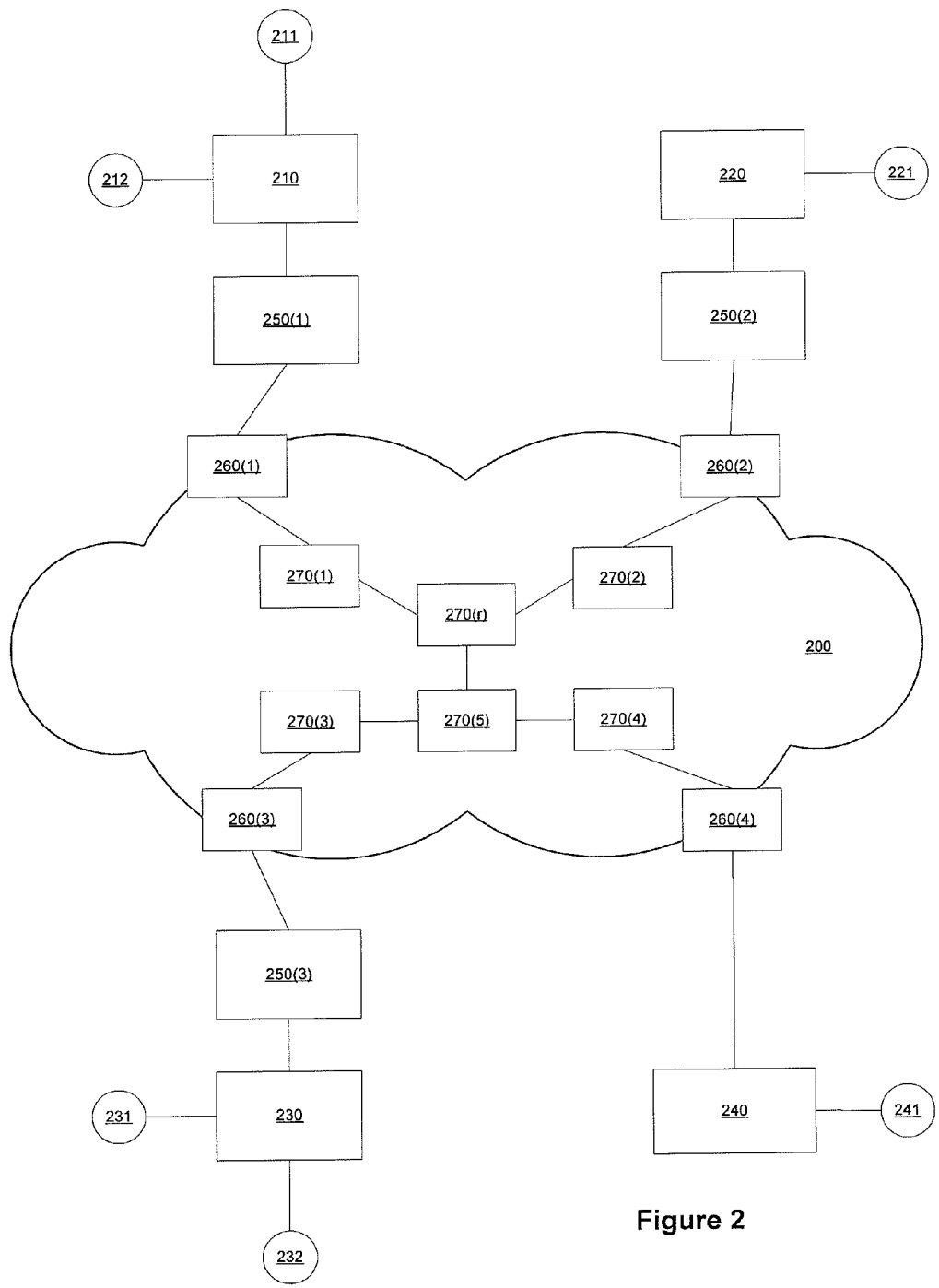
FIG. 2 is a simplified block diagram illustrating a network configuration in which geographically diverse subnets of a business' network are coupled through a provider transport network.
Figure 6:
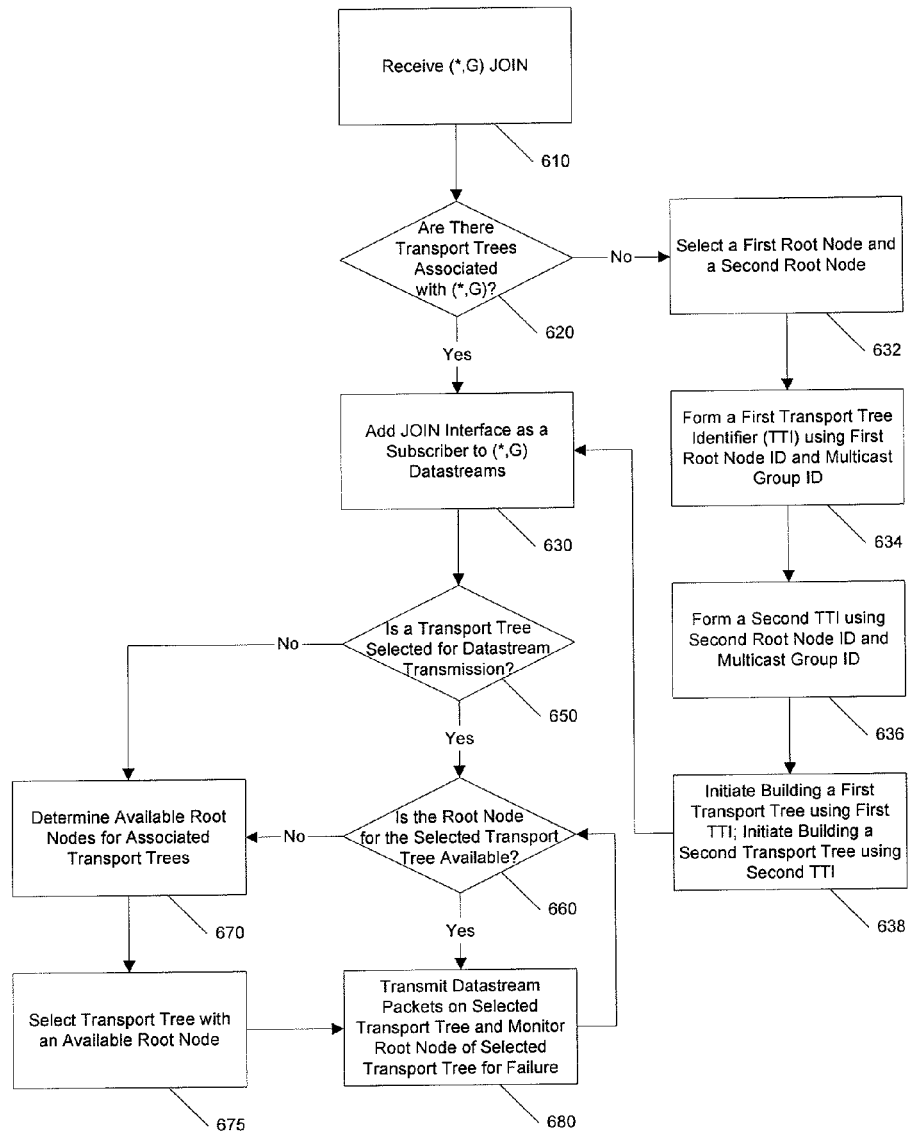
FIG. 6 is a simplified flow diagram illustrating actions that can be performed by a transport network edge router in accord with embodiments of the present invention.

FIG. 6 is a simplified flow diagram illustrating actions that can be performed by an edge router in accord with embodiments of the present invention. A transport network edge router can receive a multicast JOIN message for a group that is in bi-directional (PIM) mode from a locally coupled network node (e.g., node 250(1) of FIG. 2) for a multicast group G (610). The edge router can then determine through inspection of its routing tables whether there are any transport trees already configured through a transport network that are associated with the multicast group G referenced in the JOIN message (620). If such transport trees have already been configured, then the edge router can add the interface coupled to the network node requesting the JOIN as a subscriber to (*,G) datastreams in the edge router state tables (630).

Should no transport trees related to the referenced multicast group already be configured, then the edge router can begin the process of building a plurality of associated transport trees or branches thereof. The edge router can select a first root node and the second root node for two transport trees to be configured through the transport network (632). It should be understood that while the example illustrated in FIG. 6 refers to first and second transport trees, the present invention is not limited to constructing and selecting between two transport trees, but can involve any number of transport trees. A first transport tree identifier can then be formed using an identifier of the first root node and an identifier of the multicast group (634), and similarly a second transport tree identifier can be formed using the second root node identifier and the multicast group identifier (636).

The transport network edge router can then initiate the process of building a first transport tree associated with the first transport tree identifier and a second transport tree associated with the second transport tree identifier (638). This building process includes either constructing a new transport tree through the transport network, or constructing a branch that connects the edge router to an already existing transport tree. Upon completion of the construction of the transport trees associated with the identified multicast group in the JOIN (or branches thereof), the interface coupled to the network element requesting the JOIN can be added as a subscriber to (*,G) datastreams in the transport network edge router state tables (630). With such a configuration, an edge router coupled to subscribing nodes can receive datastreams for the multicast group and provide the datastreams to the subscribing nodes.

In order for an edge router to transmit datastreams from a coupled source to the multicast group (*,G), the edge router selects a transport tree for datastream transmission. As an initial matter, the transport network edge router can determine whether a transport tree has already been selected for datastream transmission (650). If a transport tree has been selected, then the transport network edge router can determine whether the root node for the selected transport tree continues to be available (660). In the event that inquiry 650 or 660 is negative, then the edge router can determine those root nodes that continue to be available for transport trees associated with the multicast identifier (*,G) (670). The transport network edge router can then select a transport tree from the set of those transport trees having an available root node (675).

As discussed above, selection of an available transport tree can be performed according to various criteria that are dependent upon configured network applications. For example, in a failover scenario the same initial transport tree can be selected by all edge routers associated with a particular multicast group. The edge routers can then have in place a failover mechanism that allows for the selection of the same alternative transport tree in the event of a failure of a root node associated with the first selected transport tree. In the event that the root node associated with the first selected transport tree ultimately is restored, the edge routers can be configured to immediately switch back to the first transport tree root node or can be configured to switch back to the first transport tree in the event of a failure of the root node associated with the second transport tree. As discussed above, another example of a selection of transport tree from step 675 can include load balancing from among the available root nodes for associated transport trees.

Once a transport tree has been selected for datastream transmission, the transport network edge router can transmit datastream packets on the selected transport tree, while monitoring the root node of the selected datastream for failure or unavailability (680). In the event of a root node failure, the transport network edge router can return to step 660 for further determination of available associated transport trees.

The present invention provides root node redundancy via a make-before-break mechanism of a plurality of transport trees with unique root nodes, and also provides load balancing capabilities for multipoint-to-multipoint trees. Each transport network edge router is independently responsible for choosing from available transport trees with active associated root nodes. Each transport network edge router chooses a transport tree based on local policy and reachability of the root node. Such a mechanism is made possible because each edge router associated with subscribers to a native tree transmission are members of each associated transport tree configured in the transport network. Such a mechanism is unlike root node selection protocols provided for other multipoint-to-multipoint trees such as multicast shared trees. Protocols such as Auto-RP and BSR (boot strap router) require a designated router that has a responsibility to elect the current active root for all other routers in the network. Due to the above-described selection independence of the edge routers, the present invention has no such requirement for a designated router.

Embodiments of the present invention provide for rapid continuation of data transmission for a multipoint-to-multipoint datastream by preconfiguring multiple transport trees and providing a mechanism for transport edge routers to select from among the transport trees having an active root node. The present invention further provides for load balancing from among the available root nodes and associated transport trees.

An Example Transport Network Environment

One example of a transport network within which embodiments of the present invention can be performed is a multi-protocol label switching network (MPLS). Other transport network protocols that are also applicable are interne protocol or tunneling-transport networks. A description of MPLS networks is provided below. Additional description of the MPLS network protocol is in Network Working Group Request for Comment (RFC) 3031, authored by Rosen et al. and dated January 2001.

In a typical router-based network, OSI Layer 3 packets pass from a source to a destination on a hop-by-hop basis. Transit routers evaluate each packet's Layer 3 header and perform a routing table lookup to determine the next hop toward the destination. Such routing protocols have little, if any, visibility into the network's OSI Layer 2 characteristics, particularly in regard to quality of service and link load.

To take such Layer 2 considerations into account, MPLS changes the hop-by-hop paradigm by enabling edge routers to specify paths in the network based on a variety of user-defined criteria, including quality of service requirements and an application's bandwidth needs. That is, path selection in a router-only network (Layer 3 devices) can now take into account Layer 2 attributes. In light of this dual nature, MPLS routers are called label switch routers (LSRs).

In an MPLS network, incoming datastream packets are assigned a label by an edge label switch router (e.g., provider edge router 260(1)). An edge LSR has one or more network interfaces connected to other LSRs within the transport network and one or more other network interfaces connected to non-MPLS enabled devices (e.g., a customer edge router). The label takes the form of a header created by the edge LSR and used by LSRs within the transport network to forward packets. An LSR will create and maintain a label forwarding information base (LFIB) that indicates where and how to forward packets with specific label values. The LSRs that are within a provider's network (non-edge LSRs) are commonly called core LSRs, which switch labeled packets based on the label value in the label header. All interfaces of a core LSR are connected to other LSRs (either core or edge). A path, or transport tree, defined by the labels through core LSRs between a pair of edge LSRs is called a label switch path (LSP). Label information is distributed among the LSRs through the use of a label distribution protocol (LDP). Packets are forwarded within the core network along the label switch path where each LSR makes forwarding decisions based solely on the contents of the label. At each hop, an LSR may strip off the existing label and apply a new label which tells the next hop how to forward the packet.

Figure 7:
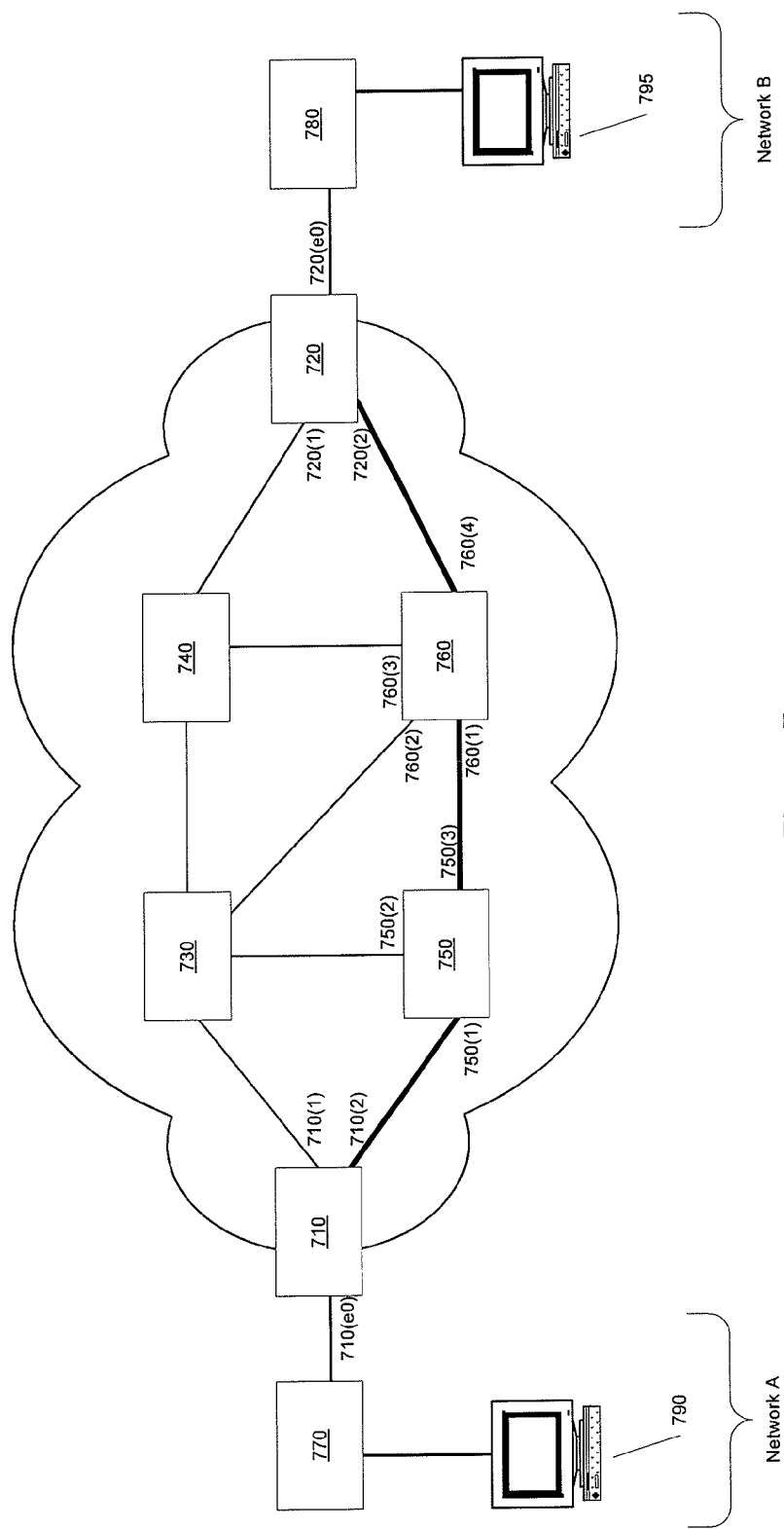
FIG. 7 is a simplified block diagram illustrating an MPLS network usable with embodiments of the present invention.

FIG. 7 is a simplified block diagram illustrating a path a datastream can take through an MPLS network. In FIG. 7, a series of LSRs (edge and core) interconnect, forming a physical path between two network elements, 790 and 795, which are connected to the MPLS network through customer edge routers 770 and 780. An Ethernet frame carrying an IP datagram generated by network element 790 will follow the standard Ethernet format with a normal Layer 2 header followed by a Layer 3 header. Because the destination address resides in a different network, customer edge router 770 forwards a packet including the IP datagram to edge LSR 710. Edge LSR 710 references its internal forwarding table (also known as a forwarding information base (FIB)) and determines that it needs to forward a packet including the IP datagram via interface 710(2) toward edge LSR 720.

The core of the MPLS network includes core LSRs 730, 740, 750, 760, which are coupled, directly or indirectly, to edge LSRs 710 and 720.

The FIB entry for the destination network in ingress edge LSR 710 indicates that edge LSR 710 must include a label with the packet to indicate what path the packet should take on its way to egress edge LSR 720 and from there to destination network element 795. The label can be inserted before the Layer 3 header in the frame passed from edge LSR 710 to the next hop core LSR 750. Core LSR 750 receives the frame at interface 750(1) and determines the presence of the label. Core LSR 750 then treats the packet according to the configuration in its label forwarding information base (LFIB), which directs the core LSR to forward the packet via interface 750(3) and to replace the old incoming label with a new outgoing label. Core LSR 760 will then handle the packet in a similar manner, receiving the packet at interface 760(1) and transmitting the packet via interface 760(4), after having stripped the label added at core LSR 750 and inserting a new label.

Edge LSR 720 is the egress point from the MPLS network for the packet. Edge LSR 720 performs a label lookup in the same way as the previous LSRs, but will have no outgoing label to use. Edge LSR 720 will then strip off all label information and pass a standard packet including the IP datagram to customer edge router 780, which will then transmit the IP frame to network element 795. It should be noted that the LSP between edge LSRs 710 and 720 can take different links than the ones indicated in FIG. 7. The table below illustrates the incoming and outgoing interface and incoming and outgoing label changes that occur at each LSR in the illustrated LSP.

TABLE 1

| Router | Incoming Label | Incoming Interface | Destination Network | Outgoing Interface | Outgoing Label |
|--------|----------------|--------------------|--------------------|--------------------|--------------|
| 710 | — | 710(e0) | B | 710(2) | 6 |
| 750 | 6 | 750(1) | B | 750(3) | 11 |
| 760 | 11 | 760(1) | B | 760(4) | 7 |
| 720 | 7 | 720(2) | B | 720(e0) | — |

A non-MPLS router makes a forwarding decision based on reading a Layer 3 destination address carried in a packet header and then comparing all or part of the Layer 3 address with information stored in the forwarding information base (FIB) maintained by the router. The non-MPLS router constructs the FIB using information the router receives from routing protocols. To support destination-based routing with MPLS, an LSR also is configured to use routing protocols and construct the LFIB using information the LSR receives from these protocols. An LSR must distribute, receive, and use allocated labels for LSR peers to correctly forward the frame. LSRs distribute labels using a label distribution protocol (LDP). A label binding associates a destination subnet with a locally significant label (see, e.g., Table 1). Labels are "locally significant" because they are replaced at each hop. Whenever an LSR discovers a neighbor LSR, the two LSRs establish a connection to transfer label bindings.

LDP can exchange subnet/label bindings using one of two methods: downstream unsolicited distribution or downstream-on-demand distribution. Downstream unsolicited distribution disperses labels if a downstream LSR needs to establish a new binding with its neighboring upstream LSR. In downstream-on-demand distribution, a downstream LSR sends a binding upstream only if the upstream LSR requests it. For each router in an upstream LSR's route table, the upstream LSR identifies the next hop for that route. The upstream LSR then issues a request (via LDP) to the downstream (next hop) LSR for a label binding corresponding to the downstream LSR. When the downstream LSR receives the request, the downstream LSR allocates a label, creates an entry in its LFIB with the incoming label set to the newly allocated label, and then the downstream LSR returns a binding between the newly allocated label and the route to the upstream LSR that sent the original request. When the upstream LSR receives the binding information, the upstream LSR creates an entry in its LFIB and sets the outgoing label in the entry to the value received from the downstream LSR. In a network using downstream-on-demand distribution, this process is repeated recursively until the destination is reached.

When an LSR receives a packet with a label, the LSR uses the label for an index search in the LSR's LFIB. Each entry in the LFIB may consist of an incoming label (the LFIB index) and one or more subentries of the form: outgoing label, outgoing interface, and outgoing link-level information. If the LSR finds an entry with the incoming label equal to the label carried in the packet, for each component in the entry, the LSR replaces the label in the packet with the outgoing label, replaces link level information (such as the MAC address) in the packet with the outgoing link-level information, and forwards the packet over the outgoing interface. This forwarding decision uses an exact-match algorithm using a fixed-length, fairly short (as composed to an L3 address) label as an index. Such a simplified forwarding procedure enables a higher forwarding performance, and can be implemented in LSR hardware rather than software. A forwarding decision is further independent of the label's forwarding granularity; that is the same forwarding algorithm applies to both unicast and multicast. A unicast LFIB entry will have one outgoing label, outgoing interface and outgoing link level information. A multicast entry can have one or more outgoing labels, outgoing interfaces, and outgoing link-level information associated with the one label.

An Example Router

Figure 8:
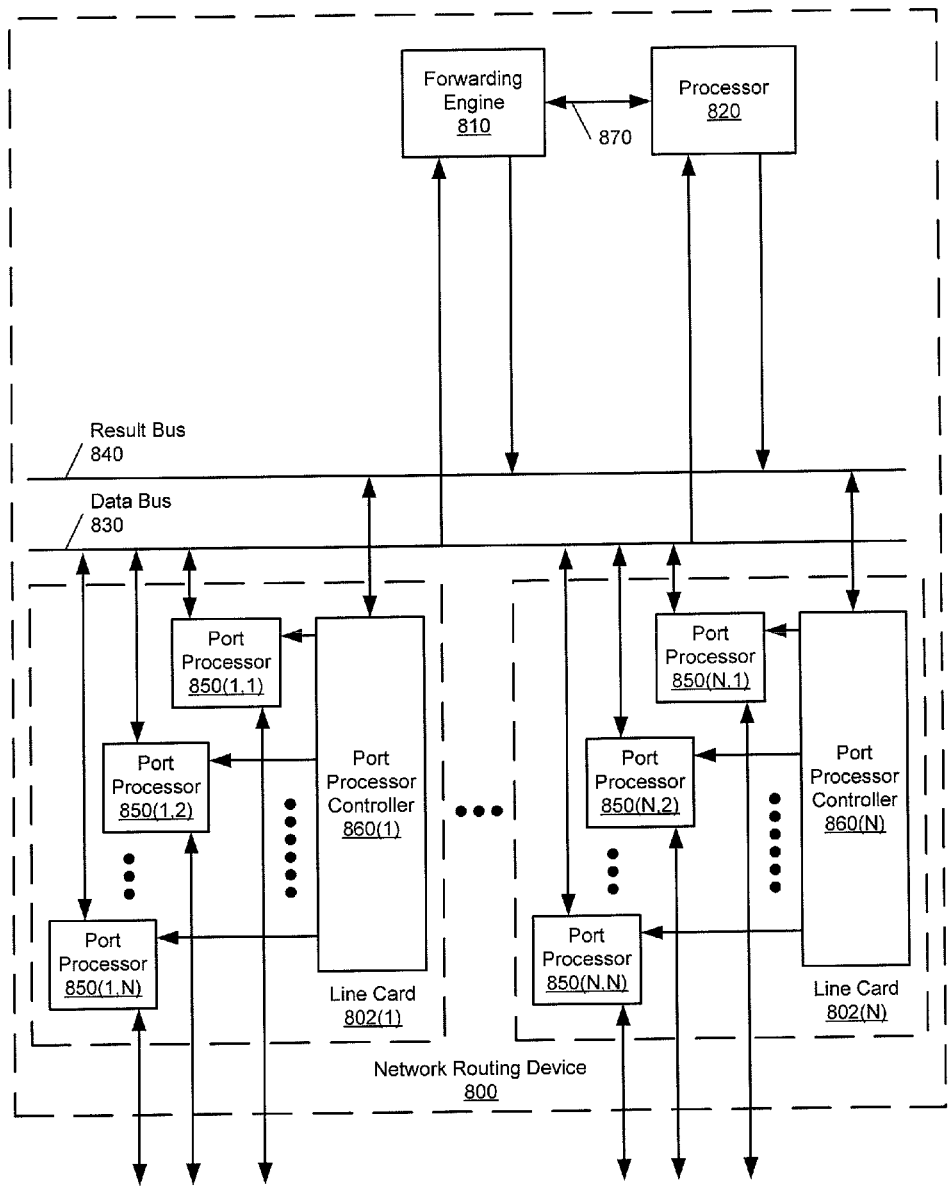
FIG. 8 is a simplified block diagram illustrating a network router element usable with embodiments of the present invention.

FIG. 8 is a block diagram illustrating a network router element. In this depiction, network router element 800 includes a number of line cards (line cards 802(1)-(N)) that are communicatively coupled to a forwarding engine 810 and a processor 820 via a data bus 830 and a result bus 840. Line cards 802(1)-(N) include a number of port processors 850(1, 1)-(N,N) which are controlled by port processor controllers 860(1)-(N). It will also be noted that forwarding engine 810 and processor 820 are not only coupled to one another via data bus 830 and result bus 840, but are also communicatively coupled to one another by a communications link 870.

When a packet is received, the packet is identified and analyzed by a network router element such as network router element 800 in the following manner, according to embodiments of the present invention. Upon receipt, a packet (or some or all of its control information) is sent from the one of port processors 850(1,1)-(N,N) at which the packet was received to one or more of those devices coupled to data bus 830 (e.g., others of port processors 850(1,1)-(N,N), forwarding engine 810 and/or processor 820). Handling of the packet can be determined, for example, by forwarding engine 810. For example, forwarding engine 810 may determine that the packet should be forwarded to one or more of port processors 850(1,1)-(N,N). This can be accomplished by indicating to corresponding one(s) of port processor controllers 860(1)-(N) that the copy of the packet held in the given one(s) of port processors 850(1,1)-(N,N) should be forwarded to the appropriate one of port processors 850(1,1)-(N,N).

In the foregoing process, network security information can be included in a frame sourced by network routing device 800 in a number of ways. For example, forwarding engine 810 can be used to detect the need for the inclusion of network security information in the packet, and processor 820 can be called into service to provide the requisite network security information. This network security information can be included in the packet during the transfer of the packet's contents from one of port processors 850(1,1)-(N,N) to another of port processors 850(1,1)-(N,N), by processor 820 providing the requisite information directly, or via forwarding engine 810, for example. The assembled packet at the receiving one of port processors 850(1,1)-(N,N) can thus be made to contain the requisite network security information.

In addition, or alternatively, once a packet has been identified for processing according to the present invention, forwarding engine 810, processor 820 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of network routing device 800). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
configuring a first transport tree within a transport network, wherein the first transport tree comprises a first root node, wherein the first transport tree is configured to transport a multipoint-to-multipoint datastream to a plurality of edge nodes, including first and second edge nodes, of the transport network through the first root node;
configuring a second transport tree within the transport network, wherein the second transport tree comprises a second root node, wherein the second transport tree is configured to transport the multipoint-to-multipoint datastream to the plurality of edge nodes through the second root node;
the first and second edge nodes receiving data of the multipoint-to-multipoint datastream from first and second data sources, respectively, which are external to the transport network;
the first and second edge nodes determining the first root node is unavailable; the first edge node selecting the second transport tree in response to determining that the first root node is unavailable;
and the second edge node selecting the second transport tree in response to determining that the first root node is unavailable.

2. The method of claim 1 further comprising:
receiving routing information that the first root node is unavailable; and
performing said determining whether the first root node is unavailable using the routing information.

3. The method of claim 1 wherein an MPLS network comprises the first and second transport trees.

4. The method of claim 3 wherein the first and second root nodes are core routers in the MPLS network.

5. The method of claim 1 further comprising:
associating a first transport tree identifier with the first transport tree, wherein
the first transport tree identifier is generated using an identifier for the first root node.

6. The method of claim 5 wherein the first transport tree identifier is further generated using one or more identifiers for the datastream.

7. The method of claim 1, wherein
said configuring the first transport tree comprises selecting the first root node, forming a first transport tree identifier, and initiating a build of the first transport tree; and
said configuring the second transport tree comprises selecting the second root node, forming a second transport tree identifier, and initiating a build of the second transport tree.

8. The method of claim 1, wherein
the first root node is logically upstream from all other nodes in the first transport tree;
the second root node is logically upstream from all other nodes in the second transport tree; and
the first root node is distinct from the second root node.

9. A transport network edge router comprising:
a plurality of network line cards, wherein
a first network line card of the plurality of network line cards is configured to transmit a datastream on a selected transport tree; and
a processor coupled to the first network line card, wherein the processor is configured to
initiate configuration of a first transport tree comprising a first root node, wherein
the first transport tree corresponds to a bidirectional multicast tree and is configured to transport the datastream to a plurality of edge nodes of a transport network through the first root node,
initiate configuration of a second transport tree comprising a second root node, wherein
the second transport tree corresponds to the bidirectional multicast tree and is configured to transport the datastream to the plurality of edge nodes through the second root node,
determine whether the first root node is unavailable, and
select the selected transport tree from the first transport tree and the second transport tree, wherein the processor is further configured to select the second transport tree in response to determining that the first root node is unavailable;
generate a first transport tree identifier using an identifier for the first root node, and
associate the first transport tree identifier with the first transport tree.

10. The transport network edge router of claim 9 further comprising:
the processor further configured to
receive routing information that the first root node is unavailable, and
use the routing information in performing said determination that the first root node is unavailable.

11. The transport network edge router of claim 9, wherein
the transport network edge router is a member of an MPLS network; and
the MPLS network comprises the first and second transport trees, wherein the first and second root nodes are core routers in the MPLS network.

12. The transport network edge router of claim 9 further comprising:
the processor further configured to
generate the first transport tree identifier using one or more identifiers for the datastream.

13. The transport network edge router of claim 9 further comprising:
- the processor further configured to initiate configuration of the first transport tree by being further configured to
  - select the first root node,
  - form a first transport tree identifier, and
  - initiate a build of the first transport tree; and
- the processor further configured to initiate configuration of the second transport tree by being further configured to
  - select the second root node,
  - form a second transport tree identifier, and
  - initiate a build of the second transport tree.

14. An apparatus comprising:
- a plurality of network line cards, wherein
  - a first network line card of the plurality of network line cards is configured to transmit a datastream on a selected transport tree;
- means for initiating configuration of a first transport tree comprising a first root node, wherein
  - the first transport tree corresponds to a bidirectional multicast tree and is configured to transport the datastream to a plurality of edge nodes of a transport network through the first root node;
- means for initiating configuration of a second transport tree comprising a second root node, wherein
  - the second transport tree corresponds to a bidirectional multicast tree and is configured to transport the datastream to the plurality of edge nodes of the transport network through the second root node;
- means for determining whether the first root node is unavailable; and
- means for selecting the selected transport tree from the first transport tree and the second transport tree, wherein the means for selecting the selected transport tree is responsive to the means for determining whether the first root node is unavailable;
- means for generating a first transport tree identifier using an identifier of the first root node; and
- means for associating the first transport tree identifier with the first transport tree.

15. The apparatus of claim 14 further comprising:
- means for receiving routing information that the first root node is unavailable; and
- the means for determining whether the first root node is unavailable further comprises means for using the routing information.

16. The apparatus of claim 14 wherein an MPLS network comprises the first and second transport trees.

17. The apparatus of claim 16 wherein the first and second root nodes are core routers in the MPLS network.

18. The apparatus of claim 14 further comprising:
- means for generating the first transport tree identifier using one or more identifiers for the datastream in addition to the identifier of the first root node.

19. A transport network edge router comprising:
- a processor configured to
  - initiate configuration of a first transport tree comprising a first root node, wherein
    - the first transport tree is configured to transport a multipoint-to-multipoint datastream to a plurality of edge nodes of a transport network through the first root node, wherein the multipoint-to-multipoint datastream comprises data from first and second sources that are external to the transport network,
  - initiate configuration of a second transport tree comprising a second root node, wherein the second transport tree is configured to transport the multipoint-to-multipoint datastream to the plurality of edge nodes through the second root node,
  - determine whether the first root node is unavailable after initiating configuration of the first transport tree and after initiating configuration of the second transport tree, and
  - wherein the processor is further configured to select the second transport tree in response to determining that the first root node is unavailable.

* * * * *

UNITED STATES PATENT AND TRADEMARK OFFICE
CERTIFICATE OF CORRECTION

PATENT NO. : 8,953,604 B2
APPLICATION NO. : 12/944901
DATED : February 10, 2015
INVENTOR(S) : Ijsbrand Wijnands, Arjen Boers and Alton Lo Page 1 of 1

It is certified that error appears in the above-identified patent and that said Letters Patent is hereby corrected as shown below:

In the claims

Column 16
Line 3, in Claim 6, replace "the datastream" by -- the multipoint-to-multipoint datastream --

Signed and Sealed this
Twelfth Day of April, 2016

Michelle K. Lee
*Director of the United States Patent and Trademark Office*